Oct. 10, 1961 W. A. FREEMAN ET AL 3,003,555
OIL PRODUCTION FROM UNCONSOLIDATED FORMATIONS
Filed Sept. 18, 1956
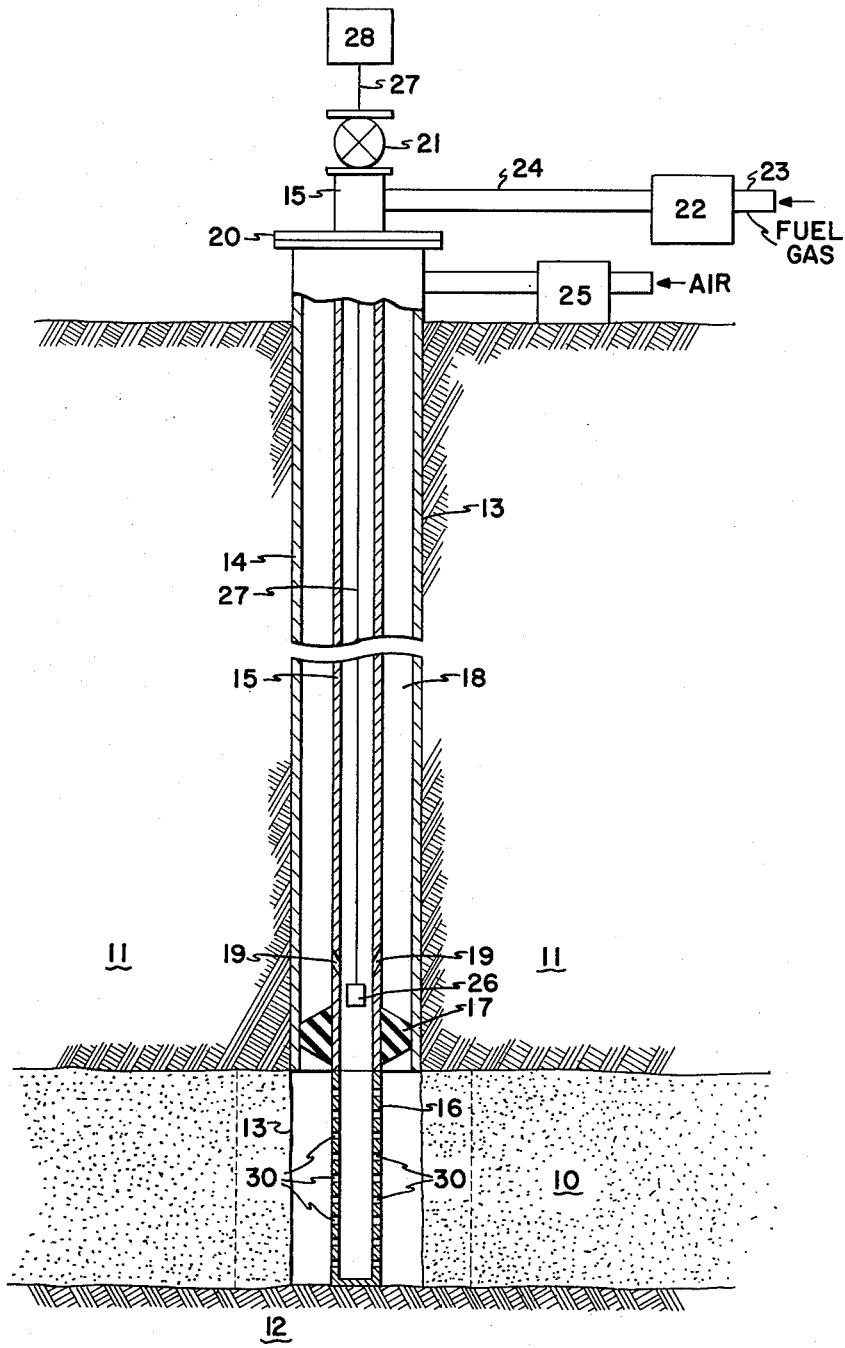
William A. Freeman
Victor G. Meadors   Inventors
By W.O. Heilman  Attorney

United States Patent Office 3,003,555
Patented Oct. 10, 1961

3,003,555
OIL PRODUCTION FROM UNCONSOLIDATED FORMATIONS
William A. Freeman and Victor G. Meadors, Tulsa, Okla., assignors, by mesne assignments, to Jersey Production Research Company
Filed Sept. 18, 1956, Ser. No. 610,578
10 Claims. (Cl. 166—21)

This invention generally relates to the production of oil from loosely consolidated or uncemented formations. More particularly, the invention concerns a method of completing a well within an unconsolidated formation whereby oil may be produced from the formation without interference from the formation itself. The invention especially concerns a method of completing and producing a well that penetrates an unconsolidated formation wherein the portion of the formation in the immediate vicinity of the well is subjected to temperatures sufficient to coke at least a part of the oil in place. The coke acts as a porous binder which consolidates or cements the sand particles together and thereby permits normal production from the formation.

In the production of oil from subterranean reservoirs, many wells are drilled into or through loosely cemented formations. When such a well is placed on production, sand is eroded from the formation and deposits within the well bore. This deposition or production of the sand interferes with the production of oil from the formation and gives rise to numerous operating problems. In some instances, the problems so occasioned may be of such magnitude as to necessitate abandonment of a well. In other instances, where the problems are not quite so severe, other conditions may exist which greatly increase the cost of the producing operation. For example, it is generally necessary to frequently work over a well which possesses a sanding problem in order to maintain economic production rates. Furthermore, sand entrained with the produced oil often causes severe erosion and damage of valves, pumps and other equipment which is employed in oil production. Again, erosion of sand from around the casing of a well tends to leave the casing inadequately supported and very prone to damage by subsidence of upper formations onto the casing. Occasionally, complete collapse of a casing may occur as a result of such subsidence.

Various methods have already been attempted or suggested to date for solving the problem of sand production in wells that pentrate uncemented formations. Thus, one procedure that has been suggested consists of cementing loose formation particles by injecting a slug of resin into a formation and causing the resin to set therein. Unfortunately, however, resins generally distribute themselves disproportionately throughout a formation, preferentially invading only high permeability zones. Furthermore, resins frequently do not set properly in the presence of formation fluids; and, being rather soft, they are themselves quite subject to erosion.

Sand filters such as slotted conduits or screens have also been used or suggested for the purpose of alleviating sand production in wells penetrating uncemented or unconsolidated formations. Such filters are usually inserted or otherwise secured within the production tubing and are positioned within a well directly opposite a producing formation. Packers are used as necessary to isolate the oil productive formation from other strata, and oil can then flow directly from the formation through the filter and thence through the production tubing to the earth's surface. While this technique has been moderately effective in improving the production of oil from unconsolidated formations, the method is not entirely satisfactory since sand production still occurs; and frequent workover operations are still required to maintain satisfactory production.

Gravel packing is still another technique that has been employed in an attempt to solve the sand production problem. In this procedure gravel is packed or otherwise placed within the annulus between the production tubing and the well bore. The gravel, in effect, acts as a sand filter and tends to retain the sand within the surrounding formation while permitting oil to escape from the formation. This technique, however, also fails to completely prevent sand production; and plugging of wells employing this procedure frequently occurs.

In view of the above shortcomings of the present techniques for completing and producing wells in uncemented formations, it is an object of the present invention to provide an improved procedure for attacking this problem. Expressed otherwise, it is a particular object of the invention to provide an improved method of completing and producing wells that penetrate loosely consolidated formations. It is an additional object of the invention to provide a practical and satisfactory yet inexpensive procedure for producing from uncemented sands.

These and related objectives, which will be explicitly mentioned or readily apparent in the description that follows, are accomplished in accordance with this invention by causing the formation and deposition of a petroleum residue binder within that portion of an unconsolidated oil-bearing formation which immediately surrounds a well bore penetrating the formation. Thus, a heated gasiform fluid is injected from the well bore into the formation so as to (1) displace at least a portion of the formation oil further into the reservoir, and (2) raise the temperature of the portion of the formation originally containing the displaced oil sufficiently to form and deposit a residual petroleum binder therein. It has been observed that the binder formed by this procedure is remarkably effective in converting an unconsolidated or sandy formation into a well cemented structure. Furthermore, the resulting structure is porous and permeable to oil, so that oil from the surrounding and still unconsolidated formation may readily migrate through the cemented portion into the well bore. The flow velocity of oil through a formation at points substantially removed from a well bore is quite low and insufficient to carry sand particles toward the well bore. Cementation of the portion of a formation near a well bore therefore eliminates any sanding problem. Furthermore, the cemented portion possesses sufficient rigidity and strength to keep the unconsolidated material in position. This technique thereby makes it possible to satisfactorily and economically produce many oil-bearing structures which previously have been commercially unattractive to produce.

As stated above, two conditions must be obtained or realized in practicing the present process. First, substantially all of the vaporizable or volatile hydrocarbons within a reservoir oil must be displaced or driven from the portion of the reservoir immediately surrounding a well bore; and the displacement must be of such a character that this portion of the reservoir is substantially devoid of hydrocarbons except for hydrocarbons of a residual or non-vaporizable nature. Second, the temperature of the portion of the reservoir immediately surrounding the well bore—i.e. the portion from which the volatile hydrocarbons have been displaced—must be increased to a value sufficient to convert the remaining residual hydrocarbons to a coke-like residue. It will be recognized, of course, that these two conditions may be realized either sequentially or simultaneously; but it is important that both conditions be obtained. Expressed otherwise, the present invention is in effect a process wherein that portion of the crude oil within an uncemented formation existing within the immediate vicinity of a well bore is subjected to destructive distillation. Volatile portions of the heated oil are vaporized and driven away from the well bore and deeper into the formation; and the residual or non-volatile portion is subjected to a temperature sufficient to for a coke-like residue. This coke-like residue coacts with the formation sand to form a rigid, strong and self-supporting reservoir structure.

Substantially all crude oils contain sufficient residual-type hydrocarbons such that the present invention is capable of forming a satisfactory coke-like binder by destructively distilling the crude oils themselves. In those instances, however, where a crude oil may not possess sufficient residual hydrocarbons to permit direct application of this process, it will be recognized that a quantity of residual hydrocarbons sufficient for carrying out the invention may be injected into a formation immediately prior to applying the process of this invention to the formation.

Any one of several procedures or combinations thereof may be employed for carrying out applicants' invention. For example, steam under a pressure sufficient to drive or propel itself into a formation may be injected from a well into the formation to drive the formation fluids away from the well. The steam should furthermore be of a temperature sufficient to vaporize substantially all of the volatile hydrocarbons in the vicinity of the well bore, so that these hydrocarbons may be driven deeper into the formation. Residual hydrocarbons remaining in the vicinity of the well bore are of a residual or asphaltic character and act as a cementitious binder to consolidate the loose sandy formation. It will be apparent that steam employed in this manner should have a pressure in excess of formation pressure, and it should have a temperature sufficient to vaporize the volatile hydrocarbons. In substantially all reservoirs, a steam temperature of at least about 400° F. should be employed, and steam temperatures up to 1100° to 1200° F. may be used. The steam may be saturated, but it preferably should be superheated.

Another possible procedure for carrying out applicants' invention consists of (1) injecting an oil displacing fluid such as water, inert gas, natural gas or the like into a formation from a well bore and (2) thereafter injecting a heated fluid such as steam, hot gases or the like into the formation. The oil displacing fluid serves to drive a portion of the hydrocarbons immediately surrounding the well bore deeper into the formation; and the heated fluid serves to (1) vaporize remaining hydrocarbons that are volatile in character and (2) heat the residual hydrocarbons sufficiently to bind them to the formation particles.

Still another method of practicing the invention consists in injecting a heated oxygen-containing gas such as air into a formation at a pressure and temperature sufficient to realize the objectives stated above. Thus, the pressure of the gas should be greater than formation pressure; the volume of gas should be sufficient to drive hydrocarbons deeply into the formation; and the temperature of the gas should be sufficient to vaporize volatile hydrocarbons from the vicinity of the well bore. The temperature of the gas additionally should be sufficient to convert remaining residual hydrocarbons into a cementitious binder that joins together the loose formation particles.

The invention may be better understood by reference to the drawing which forms part of the present description wherein the best mode contemplated for practicing the invention is illustrated.

Turning to the drawing, there is illustrated a vertical cross-section or profile of a portion of the earth showing an unconsolidated oil-bearing formation 10 which lies vertically intermediate an upper impervious formation 11 and a lower impervious formation 12. A well 13 is depicted as extending from the earth's surface down to the unconsolidated formation. Casing 14 and inner tubing or conduit 15 likewise extend from the earth's surface down to the upper boundary of formation 10. Secured to the lower end of the conduit 15 is a perforated tube 16. This tube extends throughout the vertical dimension of formation 10. A packer 17 is provided in the annular space 18 immediately above formation 10 and tube 16 so that fluid flow in the annular space is prevented throughout the entire length of the well. Ports 19 are provided in conduit 15 immediately above packer 17 thereby providing a fluid passageway which interconnects annular space 18 with the interior portion of conduit 15. These ports are preferably adapted to receive a downflowing fluid from the annular passageway 18 and to direct the fluid into conduit 15. The ports are additionally designed and adapted to intimately mix the fluid that flows through these ports in the manner just described with any fluid that may be flowing within conduit 15.

At the surface of the earth suitable well head apparatus is provided to enclose casing 14 and conduit 15. Thus, a flange member 20 is connected and sealed to the upper end of casing 14; and conduit 15 pierces this flange and extends upwardly until it terminates in valve 21. Valve 21 suitably may be a lubricator-type connection to enable an operator of the well to pass conduits and well tools up or down the well.

A fuel gas compressor 22, which may be provided with a suitable pressure regulator, is also positioned at the surface of the earth to receive fuel gas through conduit 23. The compressor 22 is additionally adapted to compress the fuel gas thus received and to pump it through conduit 24 and thence into the conduit 15.

A second compressor 25 is also provided at the surface of the earth and is adapted to supply compressed air to the annular space 18 between conduit 15 and casing 14. This compressor, like compressor 22, is preferably provided with appropriate regulators for control of the rate and pressure of the injected fluids.

An igniter 26 in the form of a spark ignition coil or the equivalent is positioned within conduit 15 at a point below ports 19 but above formation 10. A cable or other means for supplying power to the igniter 26 extends from the igniter to the surface of the earth through the valve 21 to a power source 28. Assuming for the sake of description that igniter 26 is an electrical device, it may then further be assumed that power source 28 is an electrical transformer or equivalent means for supplying current of suitable voltage to the igniter.

Having thus briefly described and enumerated the various structural components that are depicted in the drawing, attention is now directed toward a consideration of the manner in which the overall apparatus functions in carrying out the present invention. And in connection with the description of the invention, it will be assumed that formation 10 is a relatively high pressure, oil-bearing formation which is uncemented or unconsolidated and which cannot satisfactorily be produced by conventional production procedures. It will further be assumed that the casing 14 has been cemented in position and that conduit 15 and the various pieces of surface equipment have been positioned and installed. It will also be assumed that drilling mud and other well fluids have been removed if necessary from the annular space 18, and that the apparatus is in readiness for practicing the present process.

To implement the present invention, fuel gas is delivered by compressor 22 to the conduit 15; and air is delivered by compressor 25 to the annular space 18. The relative amounts of fuel gas and air are preselected and regulated so that a combustible mixture is formed within conduit 15 when the air flows through the ports 19 and enters the latter conduit. The combustible mixture of the two gases is ignited by means of igniter 26, and the hot gases of combustion flow downwardly through conduit 15 into tubing 16. From tubing 16, the hot gases flow through the perforations 30 and then into formation 10.

Necessarily, the pressure of the air and fuel gas, and also of the hot gases of combustion must exceed the pressure within formation 10. Thus, the hot gases of combustion upon entering formation 10 drive reservoir or formation fluids back into the formation from the vicinity of the well 13.

It is well known in the art that gas drives, such as the one being described in this discussion, are incapable of removing or displacing the entire volume of oil from a subterranean reservoir or formation. Thus, the hot gases of combustion are able to displace only a portion of the reservoir fluids from the portion of the reservoir that immediately surrounds the well 13. These gases, however, being heated also vaporize the volatile oil and convey the vapors into the formation in a procedure not entirely unlike distillation.

Once the hot gases of combustion have either displaced or vaporized the oil and other reservoir fluids from the portion of formation 10 that lies immediately adjacent well 13, the only hydrocarbons that remain within the swept portion of the formation are residual-type hydrocarbons such as asphalts, bitumens and the like. These materials, being substantially non-volatile, are merely heated by the hot gases of combustion and coact or combine with the formation particles to cement or bind the particles together. The portion of the formation that lies in the immediate vicinity of the well bore 13 is thereby effectively changed from a loose, sandy structure to a structure possessing sufficient strength to retain the remaining portion of the formation. This cemented portion of the formation, it should be noted, is substantially as porous and permeable to the flow of oil as the remaining untreated portion of the formation. Once the flow of fuel gas and air to the well is interrupted, and once the pressure on the well is released, oil and reservoir fluids are again free to flow into well 13. In other words, substantially normal production of formation 10 may then be realized.

It has already been stated in the above description that the pressure of the hot gases of combustion within conduit 15 and tubing 16 should exceed the pressure within the formation 10 during the gas injection step. At this point it should additionally be noted that the gases of combustion should possess a temperature at least sufficient to vaporize the volatile hydrocarbons in the swept zone as well as to cause the residual hydrocarbons to bind the formation particles together. The temperature, furthermore, should not exceed a value such that the formation particles would tend to fuse together. Fusion of the particles would reduce the porosity and permeability of the portion of the reservoir contacted by the hot gases; and production of the reservoir would accordingly be impaired.

While the precise temperature to be employed in any given formation will obviously vary to some degree, depending upon the formation and the type of oil within the formation, it may nevertheless be stated that the gases of combustion should have a temperature in the general range of about 400° F. to 1300° F.—and preferably about 500° F. to 1100° F. A temperature of about 600° F. to 800° F. is especially preferred, since temperatures within this range are applicable to substantially all types of reservoirs and crude oils.

At this point it will be recognized that some crude oils—i.e. reservoir oils—contain substantially no residual hydrocarbons. Since residual hydrocarbons are critically necessary for the purposes of the present invention, it should be noted that a sufficient quantity of such hydrocarbons may be injected into an unconsolidated reservoir when they are required. It will be apparent, of course, that the injection of these residual hydrocarbons should precede the injection of the hot gases.

Insofar as the amount of residual hydrocarbons that must be present within an unconsolidated formation is concerned, it will be noted at this point that as little as one-half percent carbonaceous residual material has been found to effectively cement or bond unconsolidated sands. It is therefore apparent that relatively small amounts of residual material need be present in a crude oil in order to satisfactorily implement this teaching.

It will be recognized that the extent of the cemented zone or portion of formation 10 may be readily controlled by the amount of hot gases that are injected into the formation. It will also be recognized that the duration of the injection period will also have a bearing on this dimension. It should be noted, however, that a zone which extends five to ten feet or more within a formation from a well bore is sufficient for the realization of this invention objective. Penetrations or zone dimensions smaller than this may on occasion be sufficient; but in the interest of safe and reliable well operation, it is preferred to have penetrations of at least the magnitude just stated. As noted above, the pressure of the gases that are injected in accordance with this invention should exceed the pressure of the formation into which they are injected. It should further be noted that the pressure must not exceed the value which would cause fracturing of the formation or lifting of the overburden. This type of condition would only aggravate the sanding condition already existing. Conveniently, the pressure of the injection gases may be regulated so as to advance the gases into a formation at a rate of about 6 inches per day or more. The rate in itself is not critically important, so long as an effective gas drive is maintained. Gas injection rates are conventionally selected within the range of about 5 to 30 cubic feet per hour per square foot of injection area; and rates of this order of magnitude are satisfactory for this invention.

Summarizing, momentarily, then, the present invention broadly concerns a method for completing and producing a well which penetrates an uncemented formation. First, oil within that portion of the formation which immediately surrounds the well is driven back into the formation by injecting an oil-displacing fluid from the well into the formation. Subsequently or simultaneously with the oil displacement technique, a hot gaseous fluid (which may also be the oil-displacing fluid) is injected from the well into the formation so as to vaporize volatile hydrocarbons and drive these hydrocarbons deeper into the formation. The heated gasiform fluid also causes any residual hydrocarbons present in the swept portion of the reservoir to bond the loose formation particles together and thereby cement this part of the formation. Following the cementing or consolidating of the portion of the formation nearest the well, the injection of the oil-displacing fluid and/or heated gasiform fluid is interrupted; the pressure on the well is reduced; and oil permitted to flow from the formation through the bonded zone into the well and thence to the surface of the earth.

While the precise process illustrated in the drawing and described earlier hereinbefore constitutes a preferred embodiment of the invention, it should be noted that the invention is not to be limited to this particular embodiment but rather by the scope of the claims that follow. It will further be noted that numerous modifications and variations may be incorporated in the illustrated and described embodiment without departing from the spirit or scope of the invention. Thus, tubing 16 may be constructed of a wide variety of materials that are heat-resistant and porous for gas flow. Similarly, packer 17 may be any conventional type packing means which is capable of establishing a fluid-tight relationship and also is resistant to heat. It will be recognized, of course, that heat resistant cements may be used in place of a packer as will be readily apparent to persons skilled in the art.

Again, while the apparatus illustrated and discussed hereinbefore is in effect a submerged-type burner, it will be recognized that surface burning equipment may also be employed if so desired. In the latter case the fuel gas and air would be combusted at the surface of the earth, and the hot gases of combustion would be directed down to the producing formation through a suitable conduit. Again, the indirect heating apparatus and procedures may be used either at the earth's surface or within a well to heat the gasiform fluid.

The invention may be better understood by reference to the following example. In this example loose sand was packed into a 4 inch internal diameter steel tube, 4 feet long. The resulting core was saturated with brine, and a portion of the brine was then displaced with a 10° API Mid-Continent type crude oil to simulate actual reservoir conditions—i.e. with crude oil and brine in place.

The core was then heated by means of an electric heating jacket to a temperature of about 350° F., following which steam was injected into the core. The steam was at about 85 p.s.i.g. and approximately the same temperature as the core; and it displaced ultimately 84.2 percent of the oil from the core. Air at 100 p.s.i.g. was then injected into the core until an additional 6 percent of the oil was recovered.

During the air injection phase of the operation, it was observed that the temperature of the last 2 feet of the core went up to a value of about 610° F.—apparently due to a reaction between the air and a portion of the oil. Subsequent removal and inspection of the core revealed that this temperature was sufficient to have caused destructive distillation of the oil remaining in the core. It was also sufficient to have caused the coke-like residue to bond the sand particles in that part of the core into a firmly cemented, strong and yet porous structure.

What is claimed is:

1. A method of completing and producing a well that penetrates an unconsolidated oil-bearing subterranean formation wherein the oil includes both volatile and residual hydrocarbons which comprises injecting an oil-displacing fluid into the formation from the well at a pressure in excess of formation pressure and in a quantity sufficient to displace a part of the oil from the portion of the formation that immediately surrounds the well bore and to move the displaced oil deeper into the formation, heating said portion of said formation to a temperature in the range from about 400° F. to about 1300° F. which is sufficient to vaporize volatile hydrocarbons and to bond residual hydrocarbons to the particles of said unconsolidated formation, thereafter terminating said heating, and reducing the pressure within the well to a value less than formation pressure so that oil may thereby flow from the formation into the well.

2. A method of completing and producing a well that penetrates an unconsolidated oil-bearing subterranean formation wherein the oil includes only volatile hydrocarbons which comprises adjusting the composition of the hydrocarbons in the formation in the vicinity of the well bore to include residual hydrocarbons by injecting residual hydrocarbons through said well into said formation, injecting an oil-displacing fluid into the formation from the well at a pressure in excess of the formation pressure and in a quantity sufficient to displace volatile oil from the portion of the formation that immediately surrounds the well bore and to move the displaced oil deeper into the formation, heating said portion of said formation in the range from about 400° F. to about 1300° F. to bond the residual hydrocarbons to the particles of said unconsolidated formation, thereafter terminating said heating and reducing the pressure within the well to a value less than formation pressure so that oil may thereby flow from the formation into the well.

3. A method of completing and producing a well that penetrates an unconsolidated oil-bearing subterranean formation wherein the oil includes both vaporizable and residual hydrocarbons which comprises injecting a gasiform fluid of a character not to support combustion into the formation from the well at a pressure in excess of the formation pressure so as to displace a part of the oil from the portion of the formation immediately surrounding the well deeper into the formation, said fluid being injected at a temperature within the range between about 400° F. and 1300° F. which temperature is sufficient to vaporize volatile hydrocarbons from said portion and to bond residual hydrocarbons to the particles of formation in said portion, thereafter ceasing injection of said gasiform fluid and withdrawing oil from said formation into said well.

4. A method as defined in claim 3 in which the gasiform fluid is injected at a temperature in the range between about 500° F. and 1100° F.

5. A method as defined in claim 3 in which the gasiform fluid comprises gases of combustion formed by burning a fuel and air.

6. A method as defined in claim 3 in which the gasiform fluid is injected at a temperature in the range between about 600° F. and 800° F.

7. A method of completing and producing a well that penetrates an unconsolidated oil-bearing subterranean formation wherein the oil in such formation includes both vaporizable and residual hydrocarbons which comprises injecting an oil displacing fluid into the formation from the well in a quantity and at a pressure in excess of the formation pressure to displace a part of the oil deeper into the formation from the portion of the formation immediately surrounding the well, thereafter injecting a gasiform fluid from the well into the formation at a temperature in the range from about 400° F. to about 1300° F. and at a pressure less than that required to fracture the formation whereby vaporizable hydrocarbons are vaporized and displaced from said portion and the residual hydrocarbons are bonded to the particles of formation in said portion surrounding the well, thereafter ceasing injection of said gasiform fluid and withdrawing oil from said formation into said well.

8. A method as defined in claim 7 in which said oil displacing fluid is steam.

9. A method of completing and producing a well that penetrates an unconsolidated oil-bearing subterranean formation wherein the oil includes both volatile and residual hydrocarbons which comprises injecting an oil displacing fluid into the formation from the well at a pressure in excess of the formation pressure and in a quantity sufficient to displace a part of the oil from the portion of the formation immediately surrounding the well bore and to move the displaced oil deeper into the formation, heating said portion of said formation to a temperature in the range of about 400° F. to 1300° F. whereby the volatile hydrocarbons are vaporized and the undisplaced residual hydrocarbons are bonded to the particles of said unconsolidated formation, thereafter terminating said heating, and reducing the pressure within the well to a value less than formation pressure so oil may thereby flow from the formation into the well.

10. A method of completing and producing a well that penetrates an unconsolidated oil bearing subterranean formation wherein the oil includes only vaporizable hydrocarbons which comprises injecting residual hydrocarbons through the well bore into the formation adjacent the well bore, injecting an oil displacing fluid into the formation from the well at a pressure in excess of the formation pressure and in a quantity sufficient to displace oil from the portion of the formation immediately adjacent the well bore and to move the displaced oil deeper into the formation, heating the said portion of said formation to a temperature in the range of from about 400° F. to 1300° F, whereby particles of said portion of said unconsolidated formation are bonded together, thereafter terminating said heating, and reducing the pressure within the well to a value less than formation pressure so that oil may flow from the formation into the well.

References Cited in the file of this patent

UNITED STATES PATENTS

| | | |
|---|---|---|
| 1,457,479 | Wolcott | June 5, 1923 |
| 2,148,717 | Whitney | Feb. 28, 1939 |
| 2,421,528 | Steffen | June 3, 1947 |
| 2,427,848 | Garrison | Sept. 23, 1947 |
| 2,642,943 | Smith | June 23, 1953 |
| 2,771,952 | Simm | Nov. 27, 1956 |
| 2,793,696 | Morse | May 28, 1957 |
| 2,862,558 | Dixon | Dec. 2, 1958 |
| 2,877,847 | Pelzer et al. | Mar. 17, 1959 |
| 2,906,340 | Herzog | Sept. 29, 1959 |